March 10, 1925.  1,529,449
F. W. ROBINSON
CIRCULAR KNITTING MACHINE FOR MAKING LACE TUCK CLOCKS
Filed Aug. 26, 1919    6 Sheets-Sheet 1
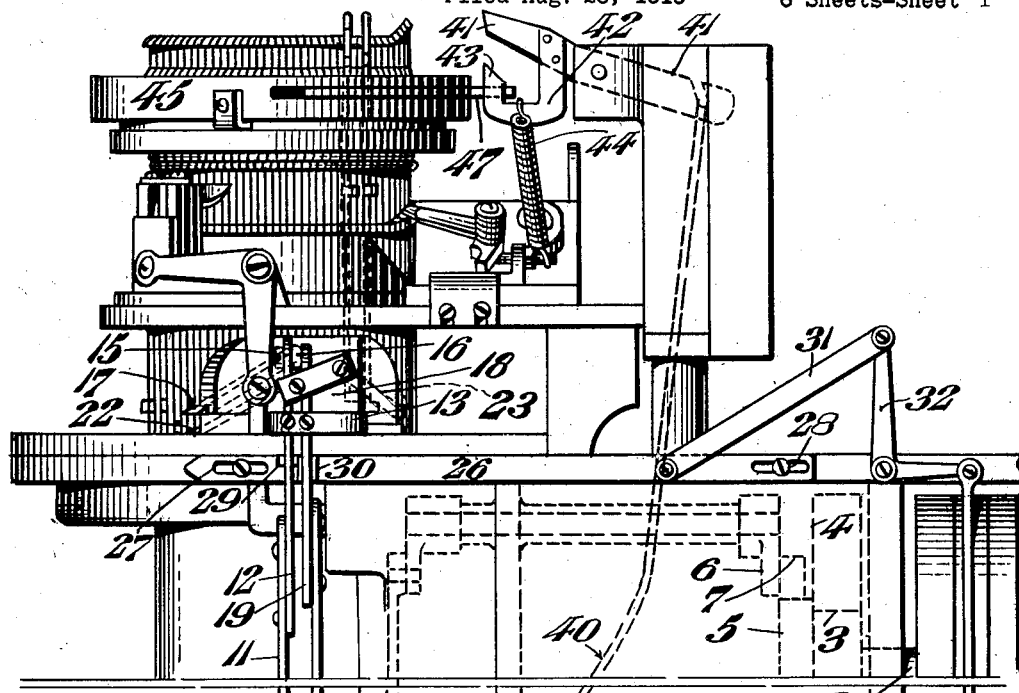
Fig.1.
Fig.2.
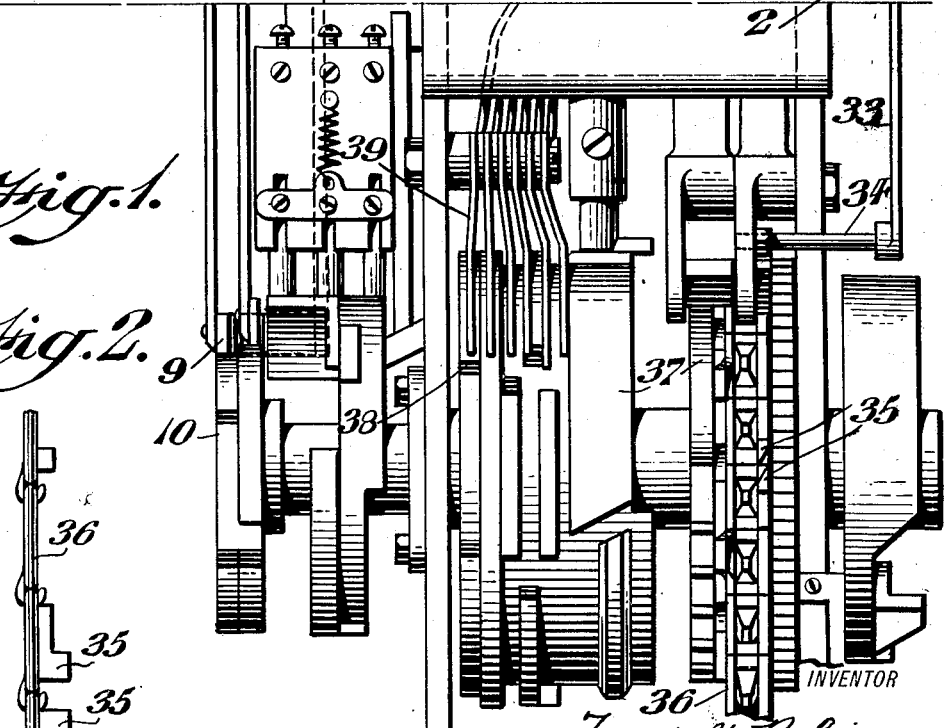
INVENTOR
Frank W. Robinson.
BY
ATTORNEYS.

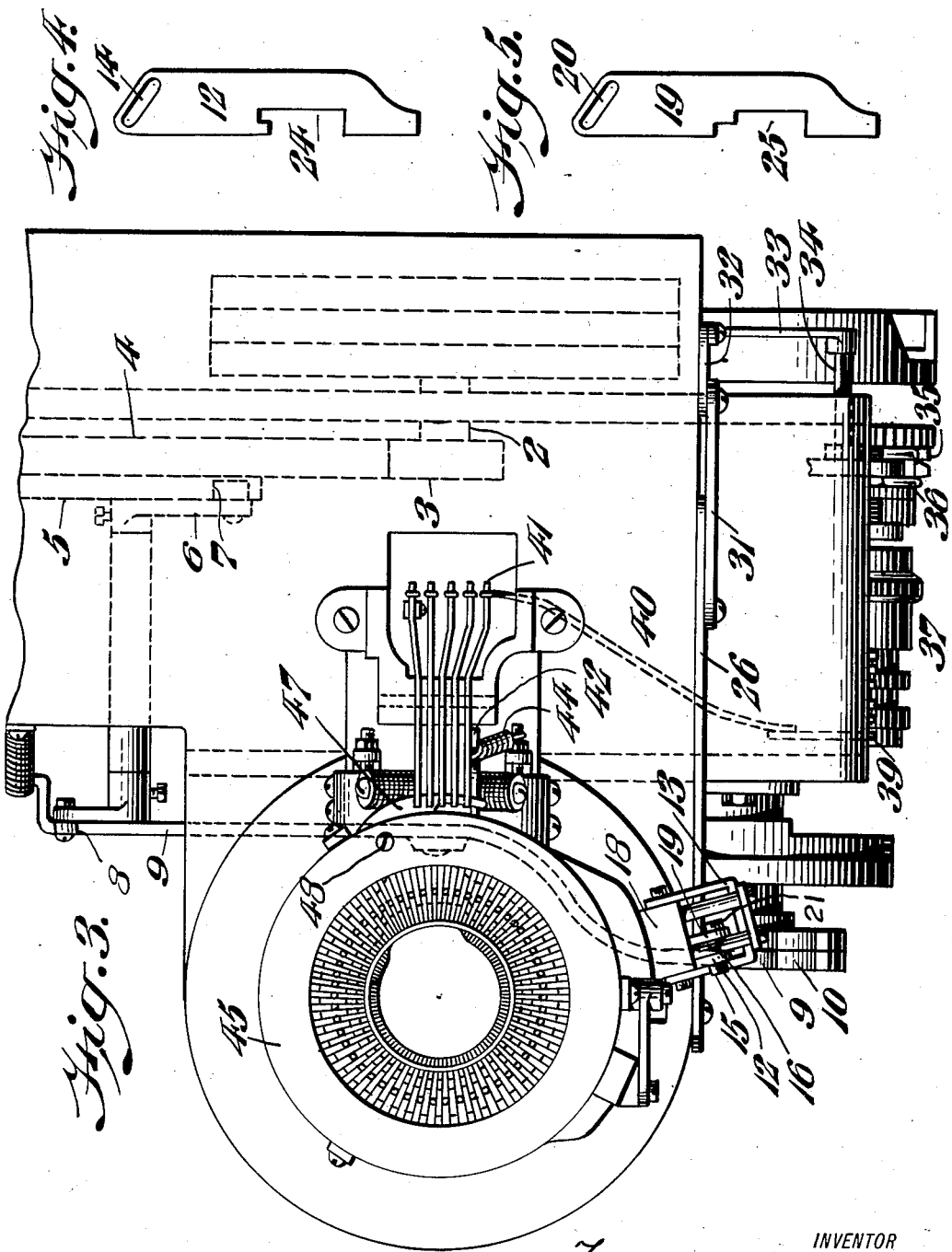

March 10, 1925. 1,529,449
F. W. ROBINSON
CIRCULAR KNITTING MACHINE FOR MAKING LACE TUCK CLOCKS
Filed Aug. 26, 1919 6 Sheets-Sheet 3
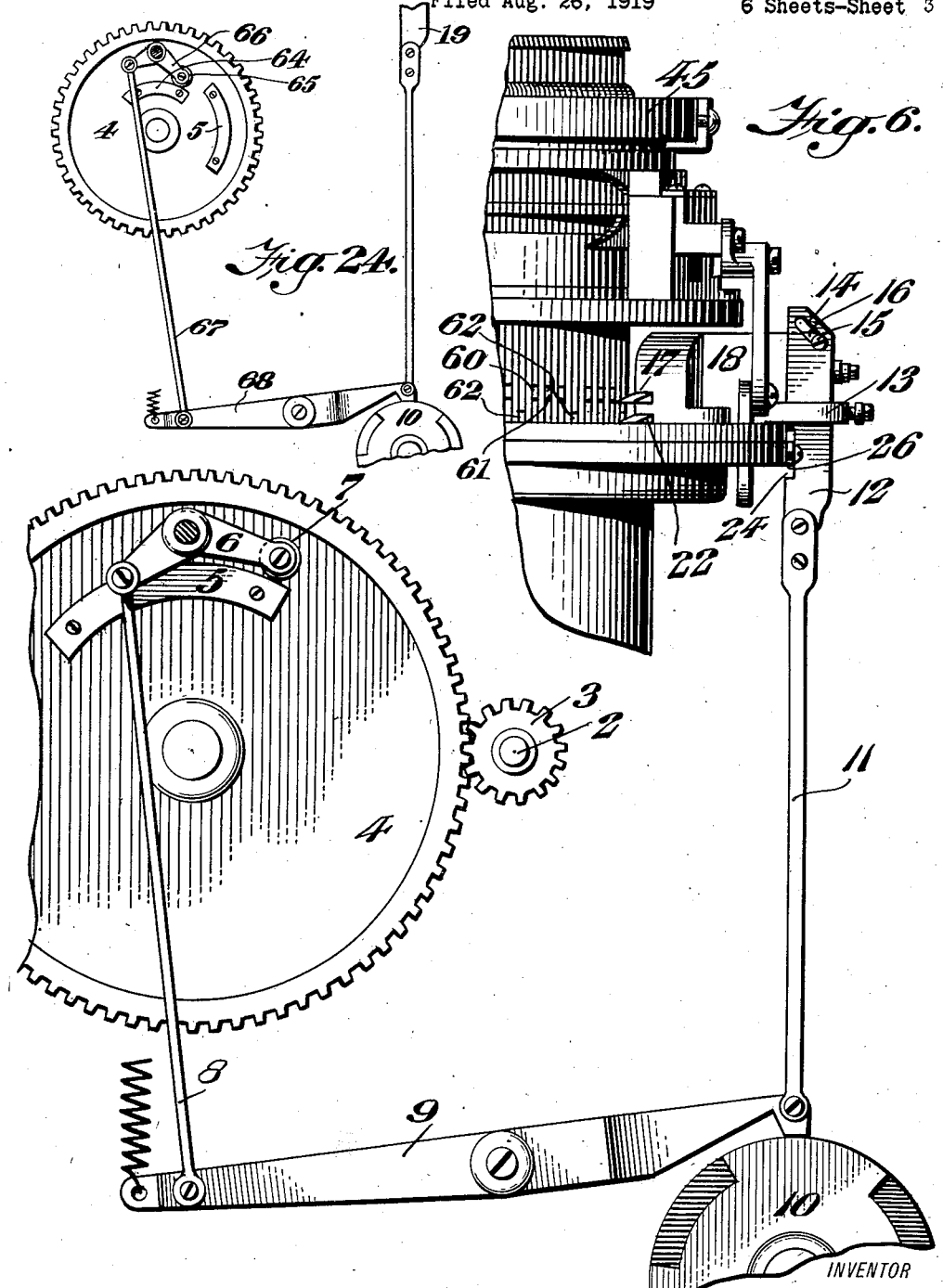

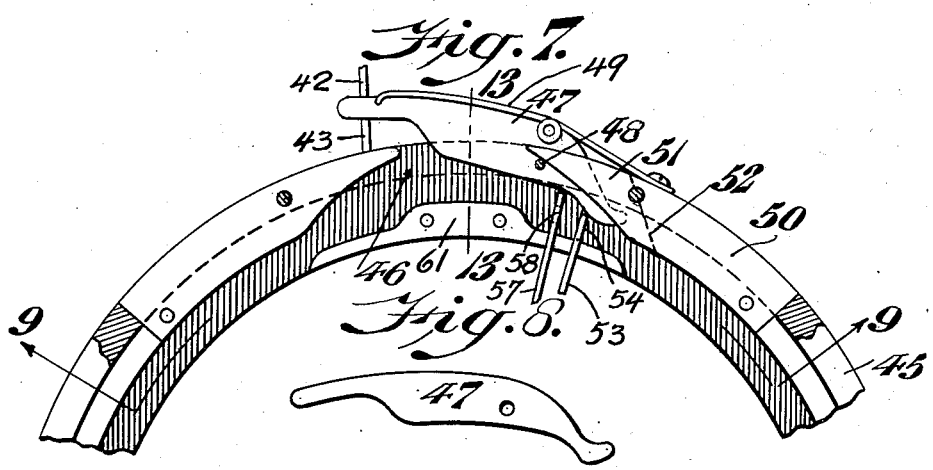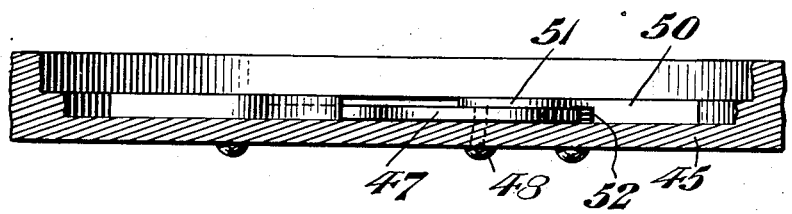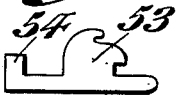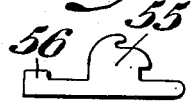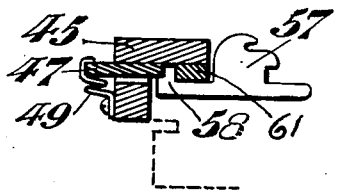

March 10, 1925.                                                          1,529,449
F. W. ROBINSON
CIRCULAR KNITTING MACHINE FOR MAKING LACE TUCK CLOCKS
Filed Aug. 26, 1919                              6 Sheets-Sheet 5
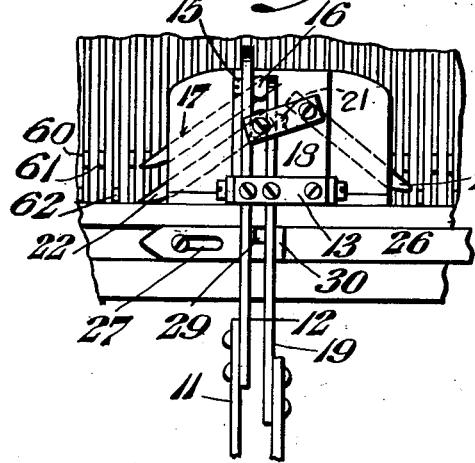
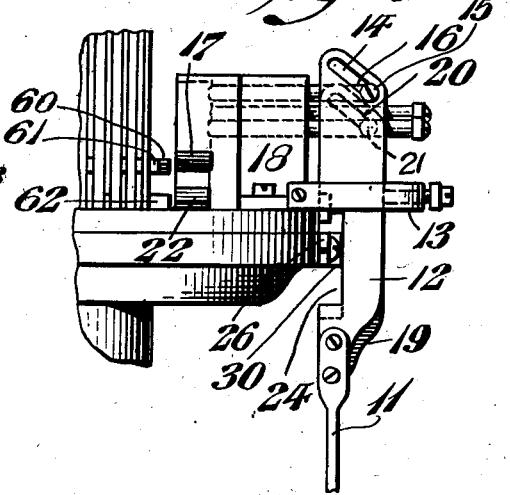
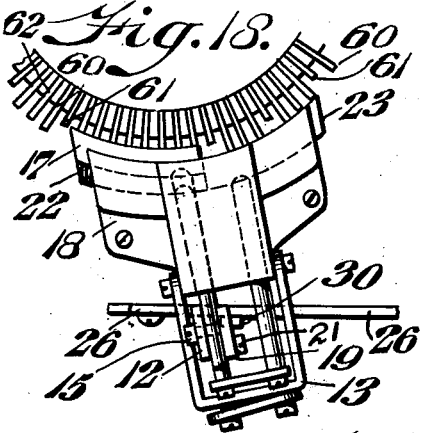
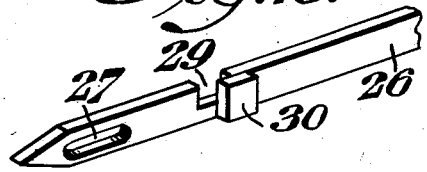
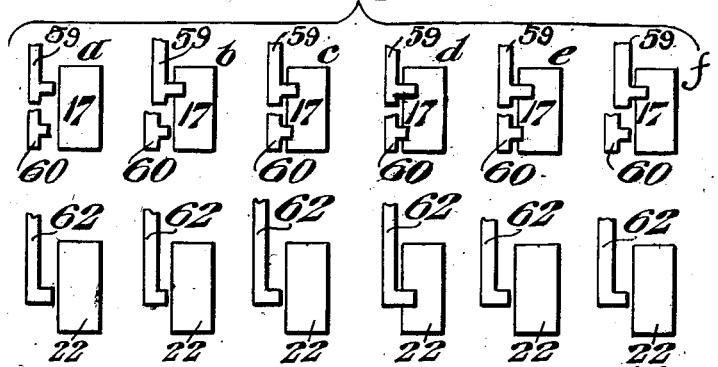
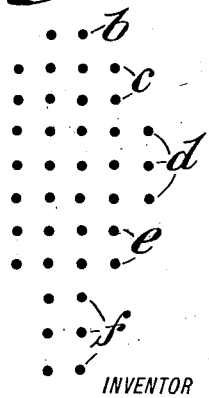
INVENTOR
Frank W. Robinson.
ATTORNEYS.

March 10, 1925.  
F. W. ROBINSON  
1,529,449  
CIRCULAR KNITTING MACHINE FOR MAKING LACE TUCK CLOCKS  
Filed Aug. 26, 1919   6 Sheets-Sheet 6

INVENTOR  
Frank W. Robinson.  
BY  
ATTORNEYS.

Patented Mar. 10, 1925.

1,529,449

UNITED STATES PATENT OFFICE.

FRANK W. ROBINSON, OF READING, PENNSYLVANIA.

CIRCULAR-KNITTING MACHINE FOR MAKING LACE TUCK CLOCKS.

Application filed August 26, 1919. Serial No. 319,957.

*To all whom it may concern:*

Be it known that I, FRANK W. ROBINSON, a citizen of the United States, residing at Reading, county of Berks, State of Pennsylvania, have invented a new and useful Circular-Knitting Machine for Making Lace Tuck Clocks, of which the following is a specification.

My present invention comprehends a novel construction and arrangement of a knitting machine whereby a lace tuck clock is formed at the head of a line of lace during the knitting operation.

I have illustrated my invention in connection with a machine now in common use in textile mills under the trade-name of the Banner circular knitting machine and illustrated in the trade catalogues of such machine and in which a rotatable pattern frame controls the various functions of the machine, although it will be apparent that my invention is not limited to such use.

It further comprehends a novel construction and arrangement of sinker controlling mechanism, a novel construction of sinkers, and a novel construction of mechanism for controlling the operation of the jack cams which in turn control the jacks.

My invention further comprehends a novel method of making a lace tuck clock in a stocking while automatically controlling the jack cam.

The present application is directed more particularly to the construction of the machine and the method of operating the jack cam while in my divisional application Serial No. 332,491, I claim the method of making lace tucked clocks in seamless hosiery and the product arising from the carrying out of the steps of such method.

It further consists of other novel features of construction and advantage which will hereinafter more clearly appear in the detailed description of my invention.

For the purpose of illustrating my invention, I have shown in the accompanying drawings a typical embodiment of it in conjunction with a Banner type of circular knitting machine. It is, however, to be understood that this embodiment is typical only and that the various instrumentalities of which my invention consists can be variously arranged and organized and that the invention is not limited to the precise arrangement and organization of these instrumentalities as herein set forth and described.

Figure 1 represents, in front elevation, a circular knitting machine of the Banner type, in conjunction with which clock forming mechanism embodying my invention is employed.

Figure 2 represents, in side elevation, a portion of the pattern chain.

Figure 3 represents a top plan view of the machine.

Figures 4 and 5 represent, in side elevation, different cam plates employed.

Figure 6 represents, in side elevation, a portion of the machine, certain of the parts having been removed for the sake of clearness of illustration.

Figure 7 represents a bottom plan view of the sinker ring.

Figure 8 represents a bottom plan view of a sinker ring cam.

Figure 9 represents a section on line 9—9 of Figure 7.

Figure 10 represents, in side elevation, the high butt sinker.

Figure 11 represents, in side elevation, the low butt sinker.

Figure 12 represents, in side elevation, the step high butt sinker.

Figure 13 represents a section on line 13—13 of Figure 7.

Figure 14 represents a bottom plan view of a cam plate seen also in Figure 7.

Figure 15 represents, in side elevation, the cam plate seen in Figure 14.

Figure 16 represents, in front elevation, a portion of the cylinder, the jacks, the jack cams and controlling means.

Figure 17 represents, in side elevation, the construction seen in Figure 16.

Figure 18 represents a top plan view of the construction seen in Figures 16 and 17.

Figure 19 represents, in perspective, a slide bar which controls at certain times the jack cams.

Figure 20 represents diagrammatically the different jacks and their cams in different positions which they assume during the making of the clock in the stocking.

Figure 21 represents diagrammatically the clock.

Figure 24 represents, in elevation, a cam employed.

Similar numerals of reference indicate corresponding parts.

Figure 22:
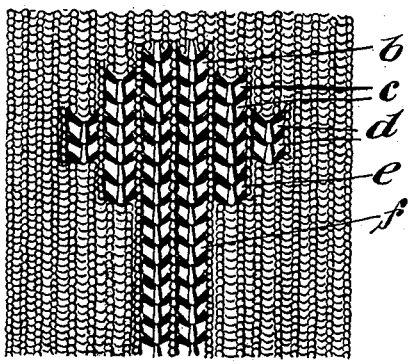
Figure 22 represents, in side elevation, a portion of the stocking with the clock formed therein.

Referring to the drawings,

I have preferred to illustrate my invention in conjunction with a machine of the Banner type although as is apparent it is not limited in its broad and generic aspects to this specific type of knitting machine. As illustrated, I employ the form, general combination and functioning of parts of the Banner type and provide in conjunction with such parts novel clock forming mechanism.

1 designates the organized machine and since machines of the Banner type are now well known in the art, I have deemed it unnecessary to illustrate and describe the entire mechanism, since the machine operates in the usual manner except at the time the clocks are being formed in the stocking.

The main driving shaft 2 has a gear 3 meshing with the timing gear 4 in the usual manner. The cam plate 5, see Figure 6, has a slightly different location on the timing gear 4 than it does in the Banner machine. The elbow lever 6 has the usual roller 7 and the lever 6 is connected by a link 8 with the lever 9 which is controlled by the cam 10 in the usual manner to raise and lower at the proper times the rod 11 fixed to the cam plate 12 which is mounted in a guide 13 and has a cam slot 14. A pin 15 passes through the slot 14 and engages the rod 16, see Figure 16, connected to the top jack cam 17 slidable in the jack cam block 18 in the usual manner. A second car plate 19 is controlled by the timing gear 4 and the cam 10 in a similar manner to the control of the cam plate 12. The gear, 4, see Figure 24, is provided with a cam face 64 located inwardly of and at one side of the cam 5 and in the path of a roller 65 on a lever 66 which is connected by means of a link 67 with a lever 68 similar to the lever 9 in construction and connected with the cam plate 19 in a similar manner to that in which the lever 9 is connected with the cam plate 12. The cam plate 19 has a cam slot 20 through which extends a pin 21 operatively connected to the lower jack cam 22 in the usual manner and the latter is connected also with the return cam 23. The cam plate 12 is cut away, as at 24, and the cam plate 19 is cut away at 25 so as to provide shoulders to co-operate with a slide bar 26 having slots 27 through which pass the screws 28 which engage the machine frame. The bar 26 is recessed in its top face as at 29 in the usual manner. On one side of the bar 26 so as to partially cover the recess 29, I secure a lug 30, the function of which is to retain the jack cams at certain times in their inoperative position for example, when the plain portions of the stocking are being knit and different jack cams are also held in inoperative position during the making of the lace work depending upon the character of clock which is being formed. In the Banner knitting machine now on the market the recess 29 is too long so that a lug 30 was applied to the bar 26 to partially cover the usual recess 29 as otherwise it would have been necessary to make a new bar 26. In case new levers are made the lug 30 would not be necessary as the recess 29 would be made the proper length. The bar 26 is connected by means of a link 31 with a bellcrank lever 32 to which is connected the bar 33 which carries the member 34 which is controlled, during the time the clock is being made, by L-shaped lugs 35 which I secure to the pattern chain 36 which is driven by the sectional pattern drum 37.

One section of the pattern drum is provided with an additional cam 38 which controls a lever 39 which is connected by means of a rod 40 with one end of a lever 41, the other end of which is provided with a hook 42 having its top face bevelled, as at 43. A spring 44 has one end connected to the hook 42 and its opposite end secured to a fixed portion of the machine. The function of the hook 42 and its adjuncts is to control the movement of the sinkers during the making of the clock so that longer threads will be drawn by the sinkers at predetermined times. I have provided a novel construction of sinkers and sinker ring in order to accomplish this result.

Figure 23:
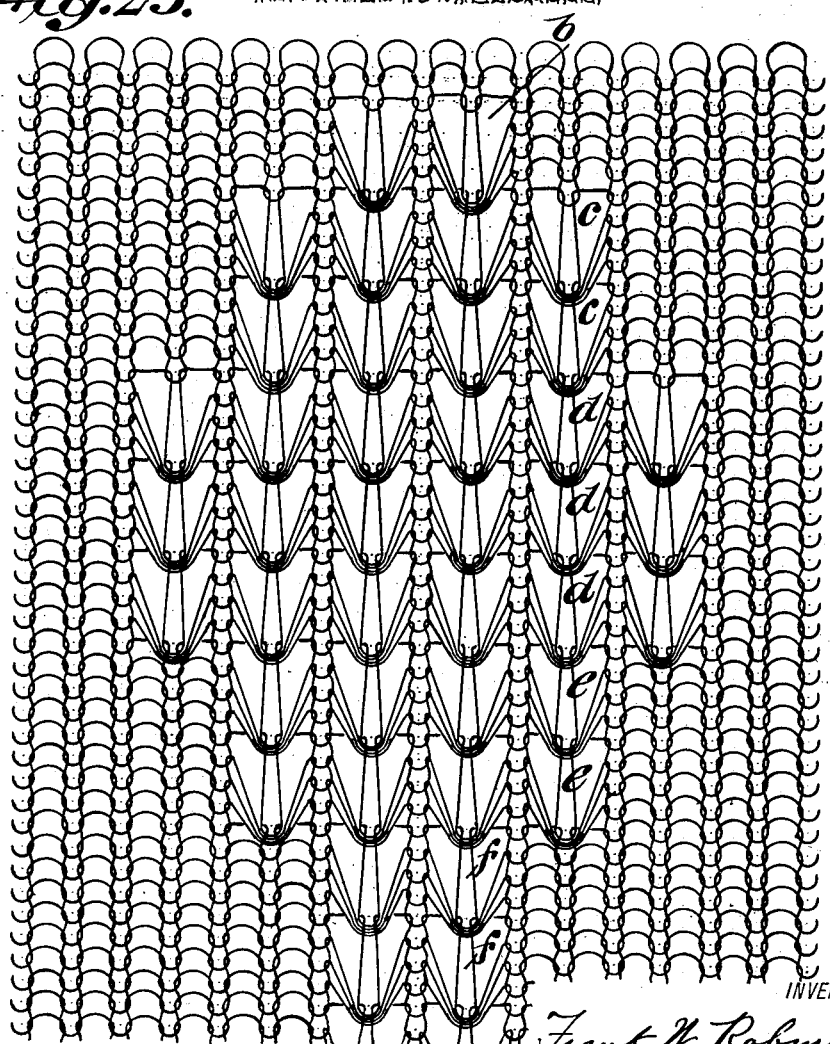
Figure 23 represents, on an enlarged scale, a portion of the stocking and the manner in which the clock is formed in it during the knitting operation.

45 designates the sinker ring a portion of which is cut away as at 46, and in lieu of such cut away portion I employ a cam lever 47 pivoted at 48 to the sinker ring, and normally maintained in the position seen in Figure 7 by means of a spring 49, one end of which is connected to an arm of the cam lever, and the other end of which is connected to the sinker ring, as will be understood from Figure 13. The spring 49 tends to move the forward end of the lever 47 inwardly and its rear end outwardly. The shape of the cam lever is best seen in Figure 8. The cam member 50 of the sinker ring, see Figures 7, 9, 14 and 15, has one side cut away as at 51 to provide a space to receive the cam lever 47 and to form an inclined wall 52 acting as a stop member for such lever, I employ three different kinds of sinkers, as will be understood from Figures 10, 11 and 12. The sinker 53 has a high butt 54. The sinker 55 has a low butt 56 and the sinker 57 has a step high butt 58. The normal operation of the sinkers is effected by means operative upon the lower portion of the butts. The high butts 54 and 58 are engaged during lace-work by lever 47 so as to hold the sinkers 53 and 57 abnormally projected. When the lever 47 is in its innermost position the sinkers 57 and 53 are held inwardly, the latter being held farther in than the former. When lever 47 is in its intermediate position it ceases to operate on sinker 57 and holds the sinker 53 somewhat inwardly, although not so far inward as when the lever was in its innermost position. This abnormally projected position of the sinkers causes a lengthening of the tuck loops. The lever 47 is urged inward by the spring 49 and is retracted by the hook 42 having an inclined wall 43 engaging under the lever. When this hook is in its upper position as shown in Figure 1, the lever is fully retracted, all sinkers operate uniformly. All of the sinkers are in action while making the plain portion of the stocking, and the high butt and step high butt sinkers are used in making the head $b$, $c$, $d$, $e$, see Figures 21, 22 and 23 of the lace courses or, as it is known in the trade, clocks and the continuation of the clock designated $f$ in Figures 21, 22 and 23. The cam lever 47 is positioned opposite to the fixed cam 61 and the position of the cam lever 47 is automatically varied by the hook 42 and its adjuncts. This cam lever 47 acts only on sinkers 53 and 57.

I employ three sets of jacks 59, 60 and 62, respectively, and the manner in which they co-operate with their respective cams during the making of the clocks is seen diagrammatically in Figure 20.

The operation of the machine and the novel manner of forming a lace tuck clock at the head of a lace course or line will now be readily apparent to those skilled in this art and is as follows:

The plain portion of the stocking is formed in the usual manner as in a Banner knitting machine. One needle is employed between two lace needles. When the lug 35 on the pattern chain is moved by the pattern drum 37 far enough to release the levers to actuate the cam plates 12 and 19 to start the two needle lace, the top cam 17 is pushed in half way from position $a$ in Fig. 20 to position $b$ to engage jacks 59 but not far enough to engage the jacks 60. After the required number of courses are made the top cam 17 is pushed in all of the way from position $b$ in said figure to position $c$ so as to engage the jacks 59 and 60. The lower cam 22 is then pushed in all of the way from position $c$ in said figure to position $d$ to engage jacks 62 and, since the top cam 17 remains in its inward position, all of the jacks are engaged to make the widest part of the head of the clock. The return cam 23, which operates with the lower cam 22, returns jacks 62 to their proper level so that they will clear the top cam. The lower cam 22 is next moved out of action and only jacks 59 and 60 are in action see position $e$ in said figure. After these courses are made the top cam 17 moves out half way and engages only jacks 59 see last position in Fig. 20 and remains in this position during the making of the long line of lace below the head of the clock until the pattern drum is moved far enough to throw the lever 9 connected to the cam plate 12 and the corresponding lever connected to the cam plate 19 which control the movement of the top and lower cams out of action.

It will be clearly understood from Figures 20, 21, 22 and 23 that when the parts are in position $a$, all of the jacks are out of action. When the parts are in position $b$ jacks 59 are in action. When the parts are in position $c$ jacks 59 and 60 are in action. When the parts are in position $d$ all of the jacks are in action. When the parts are in the position $e$ which is the same as $c$ only the jacks 59 and 60 are in action. When the parts are in the position seen at $f$ which is the same as $b$ the long line of lace is continued for a predetermined distance from the head of the lace clock.

It will be understood that, during the formation of the clock, the cam portion of the cam lever 47 is moved inwardly against the tension of its spring so that the novel construction of sinkers will move the requisite distances and draw the proper lengths of threads to prevent any detrimental tightness or deformation of the finished clock.

When the head of the clock is first being formed the cam 47 is moved inwardly and moves the sinkers 53 and 57 inwardly to draw a longer stitch. These sinkers remain in action during the formation of the head of the clock after which cam 47 is partially withdrawn so that at such time only the sinkers 53 are drawing a longer stitch, since the step on the butt 58 of a sinker 57 at this time clears the cam.

During the formation of the head of the clock the hook 42 and its adjuncts are in the position seen in Figure 1. When the line of lace forming a continuation of the head of the clock is being formed, the hook 42, see Figure 1, is depressed so that the inclined wall 43 engages the cam lever 47 to retain the sinkers 53 in action but not the sinkers 57.

During the knitting of the plain courses of the stocking the hook 42 is wholly depressed thus having no action whatever on the sinkers 53 and 57.

In so far as I am aware, I am the first in the art to form in seamless hosiery during the process of knitting a lace tuck clock and I therefore desire my claims to such features to receive the broad and generic interpretation to which a pioneer patent is entitled.

It will of course be apparent that the design of the clock may be varied as desired and I do not desire to be limited to the particular design shown, as such design is shown simply for the purpose of illustrating one manner of carrying out my invention in practice.

It will be understood that by forming a clock as a continuation of a line of lace work in a stocking the artistic appearance of the stocking is materially increased and a much higher price can be obtained for the finished product.

The clock is formed during the knitting operation so that there is no material increase in the cost of manufacture when the clock is made in stockings of this character than is present in the making of the ordinary seamless hosiery with a line or lines of lace work. The use of a needle and a controlling jack in machines of this character is old in the art, as seen in the standard catalogues of the manufacturers of the well known "Banner" type of circular knitting machines.

It will now be apparent that I have devised a novel and useful construction of a circular knitting machine for making lace tuck clocks which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a hosiery knitting machine constructed to knit seamless hosiery, the combination with the needles, the jacks, the jack cams, and the sinkers, of pattern controlled means for actuating said jack cams to cause a clock to be formed at the head of a line of lace, and pattern controlled means to actuate said sinkers to vary the lengths of threads withdrawn during the formation of the clock.

2. In a knitting machine constructed to knit seamless hosiery, the combination with the needles, the jacks and the jack cams, of pattern controlled means to actuate the jack cams to cause a clock to be formed as a continuation of a line of lace, sets of sinkers, each set having a different shaped butt, a sinker ring, a cam lever forming a wall of the cam groove of said ring, and pattern controlled means to vary the position of said cam lever.

3. In a knitting machine constructed to knit seamless hosiery, the combination with the needles, the jacks and the jack cams, of pattern controlled means to actuate the jack cams to cause a clock to be formed as a continuation of a line of lace, sets of sinkers, one set having a high butt, a second set having a low butt, and a third set having a step high butt, a sinker ring, a cam lever forming a wall of the cam groove of said ring, and pattern controlled means to vary the position of said cam lever.

FRANK W. ROBINSON.

Witnesses:
W. D. BILLMAN,
WM. H. IBACH.